United States Patent [19]

Moczygemba

[11] 4,163,765
[45] Aug. 7, 1979

[54] POLYMERIC COMPOSITIONS

[75] Inventor: George A. Moczygemba, Bartlesville, Okla.

[73] Assignee: Phillips Petroleum Company, Bartlesville, Okla.

[21] Appl. No.: 855,490

[22] Filed: Nov. 28, 1977

[51] Int. Cl.$^2$ .............................................. C08F 297/04
[52] U.S. Cl. .................................... 525/314; 525/316; 525/193; 525/342
[58] Field of Search ...................................... 260/880 B

[56] References Cited

U.S. PATENT DOCUMENTS

| | | | |
|---|---|---|---|
| 3,670,054 | 6/1972 | De LaMare | 260/880 B |
| 3,700,748 | 10/1972 | Winkler | 260/880 B |
| 3,753,936 | 8/1973 | Marrs | 260/880 B |
| 3,823,203 | 7/1974 | De LaMare | 260/880 B |

Primary Examiner—Paul R. Michl

[57] ABSTRACT

Linear and branched teleblock copolymers having the configuration (A—B—C)$_n$Z and their hydrogenated derivatives are disclosed, wherein n is an integer from 2 to 4, Z is the residue of either a polyfunctional coupling agent or a polyfunctional initiator or is a covalent chemical bond when n=2, A is a block of a polymerized monovinylarene monomer having 8 to 16 carbon atoms per monomer unit, B is a block of a polymerized conjugated diene having 4 to 12 carbon atoms per monomer unit in which said polymerized block has on the average at least one hydrocarbyl side chain branch for about every 10 carbon atoms of the polymeric backbone, and C is a low vinly polybutadiene block. The hydrogenated teleblock copolymers have the configuration (A—B'—C')$_n$Z wherein n, Z, and A are as defined above, B' is a hydrogenated block B and C' is hydrogenated block C.

12 Claims, No Drawings

POLYMERIC COMPOSITIONS

BACKGROUND OF THE INVENTION

This invention relates to novel teleblock copolymers. In one of its more specific aspects, this invention relates to novel thermoplastic elastomers.

Block copolymers of monovinylarenes, such as styrene, with conjugated dienes, such as butadiene or isoprene, have been studied in considerable detail during the past few years. Furthermore, many hydrogenated derivatives of these block copolymers have been prepared. A wide spectrum of these hydrocarbon polymers have been developed in which their physical properties are related to the molecular weights of the individual polymer blocks and, further, to the ratio of the thermoplastic blocks, e.g., polystyrene, to elastomeric blocks, e.g. polybutadiene, as well as to the number of blocks within any given polymer chain.

Such polymers have properties varying from those of plastics to those of elastomers and are generally referred to as thermoplastic elastomers. While these theromplastic elastomers have been utilized in many commercial applications, they exhibit certain physical characteristics which in some instances it would be desirable to alter or enhance.

For example, the tensile strength and elongation of some thermoplastic elastomers have sometimes been less than desirable. Moreover, it has been noted that they are subject to oxidation and degradation in the presence of air or light.

Thus, it would be desirable to have a line of thermoplastic elastomers that exhibit improved green tensile strength and environmental resistance.

Accordingly, it is one object of this invention to provide new polymers having improved properties.

Another object of this invention is to provide new polymers of monovinylarenes and conjugated dienes.

An additional object of this invention is to provide novel linear and branched teleblock copolymers which exhibit improved high green tensile strength and improved environmental resistance.

Further objects, advantages, details and embodiments of this invention will become apparent to those skilled in the art from the following description of the invention, the examples and the appended claims.

In accordance with this invention, it has been found that linear and branched teleblock copolymers having the configuration $(A-B-C)_nZ$ retain their thermoplastic elastomeric properties after hydrogenation. Moreover, hydrogenation converts the parent polymers to novel thermoplastic elastomers which have a higher green tensile strength than the parent polymers. The hydrogenated teleblock copolymers have rubbery properties, and at the same time can be handled and shaped like the unhydrogenated parent polymers.

Thus, in accordance with one embodiment of this invention, there are provided novel block copolymers of the general configuration $(A-B-C)_nZ$ wherein n is an integer of from 2 to 4, A is a block of a polymerized monovinylarene monomer having 8 to 16 carbon atoms per monomer unit, B is a block of a polymerized conjugated diene having 4 to 12 carbon atoms per monomer unit wherein said polymerized block has on the average at least one hydrocarbyl side chain branch for about every 10 carbon atoms of the polymeric backbone, and C is a low vinyl polybutadiene block. Z is the residue of either a polyfunctional coupling agent having at least two reactive sites or a polyfunctional initiator having at least two reactive sites or is a covalent chemical bond when n=2.

In accordance with another embodiment of this invention, there are provided novel hydrogenated linear or branched teleblock copolymers of the general configuration $(A-B'-C')_nZ$ wherein A is a block of a polymerized monovinylarene monomer having 8 to 16 carbon atoms per monomer unit, B' is a hydrogenated block of a polymerized conjugated diene having 4 to 12 carbon atoms per monomer unit wherein said polymerized block has on the average at least one hydrocarbyl side chain branch for about every 10 carbon atoms of the polymeric backbone, and C' is a hydrogenated block of low vinyl polybutadiene. Z is the residue of either a polyfunctional coupling agent having at least two reactive sites, or a polyfunctional initiator having at least two reactive sites, or is a covalent chemical bond when N=2.

The terms "hydrogenated" and "hydrogenation," as used herein, refer to the fact that from about 10–100%, more preferably from about 70–100%, of the total olefinic double bonds have been removed without removing substantial amounts of aromatic unsaturation.

The novel hydrogenated block polymers of this invention are thermoplastic elastomers. In particular, the hydrogenated polymers of this invention have an unexpected and significantly improved high green tensile strength. The hydrogenated polymers thus obtained have rubbery properties but at the same time can be handled and molded as a typical thermoplastic elastomer.

The block A is a block of polymerized monovinylarene monomer having 8 to 16 carbon atoms per monomer unit.

Some examples of suitable monovinylarenes are styrene, alpha-methylstyrene, 3-methylstyrene, 4-n-propylstyrene, 4-methoxystyrene, 1-vinylnaphthalene, 4-cyclohexylstyrene, and p-tolylstyrene.

Within one embodiment of this invention, styrene is the preferred monomer for formation of block A.

Block B is a block of a polymerized conjugated diene having 4 to 12 carbon atoms per monomer unit wherein said block has on the average at least one hydrocarbyl side chain branch for about every 10 carbon atoms of the polymeric backbone.

Some examples of such suitable conjugated dienes are isoprene, 2,3-dimethyl-1,3-butadiene, piperylene, 3-butyl-1,3-octadiene, 2-phenyl-1,3-butadiene, and 1,3-butadiene.

In the formation of polybutadiene from 1,3-butadiene, polymerization can be carried out so that greater than 30 mol percent of 1,2-polymerization occurs, with the remaining percentage being 1,4-polymerization. Thus, within one embodiment of this invention, a polybutadiene having a pendant vinyl content or a 1,2 microstructure greater than 30 mol percent is preferred for block B.

Within yet another embodiment of this invention, isoprene is the most preferred monomer for block B.

Block C is a polybutadiene having low vinyl content. It is important to this invention that this block is highly linear, i.e. contains as little branching as possible. It is well known in the art that during the polymerization of 1,3-butadiene, the formation of a small percentage of pendant vinyl groups is unavoidable. The term "low vinyl content," as used herein, refers to a polymer in which no more than about 15 mol percent of the 1,3-butadiene monomer polymerizes by way of the 1,2-polymerization mode. In other words, the polymerization is carried out so that a minimum of about 85 mol percent of the 1,3-butadiene monomers undergoes 1,4-polymerization and there occurs only up to about 15 mol percent of 1,2-polymerization.

In accordance with the presently most preferred embodiment of this invention, the novel polymer has the structure (polystyrene-polyisoprene-low vinyl polybutadiene)$_n$Z wherein n is an integer of from 2 to 4 and Z is the residue of either a polyfunctional coupling agent or a polyfunctional initiator or is a covalent chemical bond when n=2.

The monomer ratio in weight percent of the entire block polymer can be varied considerably. In the following table the generally employed and preferred ranges for the monomers are shown.

Table I

| | Polymer Block | | |
|---|---|---|---|
| | A | B | C |
| Generally employed ranges (wt. %) | 10–60 | 10–80 | 5–60 |
| Preferred ranges (wt. %) | 20–40 | 40–60 | 10–30 |

The weight average molecular weight of the block polymer of this invention can vary within a broad range. Typically, the weight average molecular weight will be in the range of about 5,000 to about 1,000,000. The preferred range is about 100,000 to about 600,000. Variances from the above ranges are within the scope of this invention. Such variances could be necessitated, for instance, by unusual utility requirements.

The non-hydrogenated copolymers of this invention as defined above are useful copolymers which additionally can be hydrogenated into polymers that are also thermoplastic elastomers.

In accordance with the presently most preferred embodiment of this invention, the novel hydrogenated polymer has the structure (polystyrene-hydrogenated polyisoprene-hydrogenated low vinyl polybutadiene)$_n$Z wherein n is an integer of from 2 to 4 and Z is the residue of either a polyfunctional coupling agent or a polyfunctional initiator or is a covalent chemical bond when n=2.

These hydrogenated block copolymers exhibit elastomeric properties without curing and and therefore valuable as thermoplastic elastomers.

The ranges for the monomer weight percentages in the three blocks, as well as the ranges for the molecular weight of the polymers given above in connection with the non-hydrogenated polymers, apply to the hydrogenated polymers as well, taking into consideration, of course, the modification caused by the hydrogenation of the olefinic unsaturation.

The preparation of the non-hydrogenated block copolymers follows processes already known in the block polymerization art. The copolymers may be formed by a sequential process, a sequential-coupling process, or by use of polyfunctional polymerization initiators.

The sequential-coupling process is preferred for the formation of block copolymers. The sequential-coupling process is carried out by first polymerizing at least one monovinylarene monomer having 8 to 16 carbon atoms per molecule in the presence of an organomonolithium initiator until substantially no initial monomer remains in the reaction mixture, adding a conjugated diene having 5 to 12 carbon atoms per molecule to the reaction medium in order to add to said monovinylarene block a block of polymerized branched conjugated diene having 5 to 12 carbon atoms per monomer unit wherein said polymerized branched conjugated diene has on the average at least one hydrocarbyl side chain branch for about every 10 carbon atoms of the polymeric backbone. Following the formation of the block of the branched polymerized conjugated diene, 1,3-butadiene is then added to the polymerization mixture and polymerized, essentially in the absence of vinyl promoting agent, onto the polymerization product of the first two steps, forming the living polymer poly(monovinylarene)-poly(branched conjugated diene)-poly(1,3-butadiene)lithium. The living polymer is then conveniently reacted with a polyfunctional coupling agent having at least two reactive sites capable of reacting with the carbon-lithium bond of the living polymer. By regulating the amounts of the living polymer and the amounts of the polyfunctional coupling agent, it is possible to produce either a linear configuration when a difunctional coupling agent is employed or a branched or radial configuration with polymer branches extending outwardly from the nucleus Z when a tri- or higher functional coupling agent is employed. The above described process will produce polymers that have a nucleus Z that is derived from the polyfunctional coupling agent which reacted with the lithium-terminated polymer.

In the use of polyfunctional initiators, the first step comprises polymerizing 1,3-butadiene, essentially in the absence of vinyl promoting agent, in the presence of a polyfunctional initiator, adding a conjugated diene having 4 to 12 carbon atoms per molecule to the reaction medium in order to add to said low vinyl polybutadiene block a block of polymerized branched conjugated diene having 4 to 12 carbon atoms per monomer unit wherein said polymerized branched conjugated diene has on the average at least one hydrocarbyl side chain branch for about every 10 carbon atoms of the polymeric backbone. If 1,3-butadiene is used for the formation of the poly(branched conjugated diene) block, a suitable vinyl promoter must be added along with the monomer, as described hereinafter. Following the formation of the block of the branched polymerized conjugated diene, at least one monovinylarene monomer having 8 to 16 carbon atoms per molecule is then added to the polymerization mixture and polymerized onto the polymerization product of the first two steps. It is possible to produce either a linear configuration when a difunctional initiator is employed or a branched or radial configuration with polymer branches extending outwardly from the nucleus Z when a tri- or higher functional initiator is employed. The above described process will produce polymers that have a nucleus Z that is derived from the polyfunctional initiator.

In addition to those copolymer species in which the blocks C are connected by the residue of a polyfunctional compound, there are also contemplated linear block copolymers without said residue, these copolymers being depicted as either (A—B—C—)$_2$ or A—B—C—B—A, these two structural formulas being considered as equivalent. One process for producing such polymers comprises, in its most simple form, the addition of the desired monomers in five sequential steps in a hydrocarbon medium using an organomonolithium initiator. Another process comprises the combined use of a sequential polymerization process with a coupling step involving a specific type of coupling agent. In this process the A—B—C—Li living polymer is formed after which a coupling agent, such as chlorine, bromine, iodine, iodine monochloride, or iodine trichloride is added, said coupling agent causing the terminal blocks C of the two living polymers to be joined by a covalent chemical bond.

The charge order of the monomers in the preparation of these novel polymers is dependent on whether an organomonolithium or multichelic initiator is used. In the preparation of polymers using an organomonolithium initiator and a coupling agent, the charge order is monovinylarene, $C_5$ to $C_{12}$ conjugated diene, 1,3-butadiene, followed by the addition of the coupling agent. When no coupling step is involved, the charge order is monovinylarene, $C_5$ to $C_{12}$ conjugated diene, 1,3-butadiene, $C_5$ to $C_{12}$ conjugated diene, monovinylarene. When a multichelic initiator is used, the monomers are charged in the reverse order, 1,3-butadiene, $C_4$ to $C_{12}$ conjugated diene, monovinylarene, and the coupling step is omitted from the process.

In particular, if a polybutadiene having a pendant vinyl content or 1,2 microstructure greater than 30 mol percent is used as block B, a multichelic initiator and the reverse charge order must be employed since the 1,2-polymerization inducing agent required for the formation of said vinyl-containing polybutadiene block B can be charged only after the formation of the low vinyl polybutadiene block C of the polymer.

The preferred class of polymerization initiators are the organomonolithium compounds of the formula RLi, wherein R is a hydrocarbyl radical having 1 to 20 carbon atoms selected from the group consisting of aliphatic, cycloaliphatic, and aromatic radicals and combinations thereof.

Some examples of suitable organomonolithium compounds are methyllithium, isopropyllithium, n-butyllithium, sec-butyllithium, t-octyllithium, n-dodecyllithium, n-eicosyllithium, phenyllithium, 1-naphthyllithium, p-tolyllithium, 4-phenylbutyllithium, cyclohexyllithium, and 4-cyclohexylbutyllithium.

The multichelic initiators that can be employed in this invention are the organolithium compounds of the formula $R'Li_x$, wherein $R'$ is a hydrocarbyl radical selected from the group consisting of aliphatic, cycloaliphatic, and aromatic radicals and combinations thereof, wherein x is an integer of 2 to 4, and wherein $R'$ has a valence equal to integer x.

Examples of suitable multichelic initiators are dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, and 1,2,3,5-tetralithio-4-hexylanthracene.

Other suitable multichelic organolithium initiation agents are the alpha-lithio multi-substituted dialkylbenzenes and corresponding oligomers such as 1,3-bis(1-lithio-3-methylpentyl)benzene, often referred to as DiLi-3.

The amount of organomonolithium or multichelic initiator employed frequently depends upon the desired molecular weight of the polymer. The amount is normally in the range of about 0.1 to about 100 milliequivalents of lithium per 100 grams of total monomers.

The polymerization in accordance with this invention is preferably carried out in the presence of a diluent. Suitable diluents are the paraffinic, cycloparaffinic, aromatic hydrocarbons and mixtures thereof which are not detrimental to the polymerization. Some examples of said diluents are n-hexane, n-heptane, 2,2,4-trimethylpentane, cyclopentane, cyclohexane, benzene, toluene, and the xylenes and mixtures thereof.

The amount of diluent employed can be varied broadly. The amount is normally in the range of about five to ten times the weight of all the monomers employed.

The coupling of lithium-terminated polymers is a process known to the art. In this invention, coupling involves treating the lithium-terminated polymer with a polyfunctional compound having at least two reactive sites capable of reacting with the carbon-lithium bond of the living polymer. In such a process, the polyfunctional compound affords a nucleus from which radiate polymeric branches. Examples of such suitable polyfunctional coupling agents are organo di- or polyhalides, metal halides, silicon halides or esters, organic esters and anhydrides, and divinylarenes.

The preferred coupling agents include silicon tetrachloride and divinylbenzene.

The amount of coupling agent employed is in the range of about 0.1 to 6 equivalents of coupling agent based on the lithium present in the polymer. The preferred amount is one equivalent of coupling agent per equivalent of polymer lithium.

As already indicated above, essentially no agent is employed during the polymerization of the 1,3-butadiene to form the block C, which would promote formation of vinyl unsaturation content within the polymer, i.e. would promote 1,2-polymerization. The degree of 1,2-polymerization occurring in the absence of vinyl promoting agents will normally be within the range of about 1 to about 10 mol percent of the total polymerized 1,3-butadiene in block C.

The polymerization time for each monomer charged in the process of this invention can vary broadly. The polymerization time for each monomer charge generally is in the range of a few minutes to 6 hours, preferably from 10 minutes to 2 hours.

The polymerization temperature can vary substantially and can be in the range of 15°–150° C. The preferable polymerization temperature is in the range of 40°–90° C.

Various materials are known to be detrimental to the initiator system employed in preparing polymers of this invention. Therefore, it is desirable that the reactants, diluents, and initiator employed in the process of this invention be free of these materials, as well as any other materials which may tend to interfere with the desired polymerization. Furthermore, it is desirable to remove air and moisture from the reaction vessel in which the polymerization is to be conducted.

An antioxidant is preferably added to the polymer solution prior to the recovery of the polymer. The addition of the antioxidant to the polymer solution has been found to be advantageous since its presence is a deterrent to polymer oxidation. An example of an antioxidant that can be added to the polymer solution is 2,6-di-t-butyl-4-methylphenol.

Upon completion of all steps required to prepare the polymers representative of the aforementioned general formulas, the polymerization mixture is treated so as to isolate the polymer. A suitable method for accomplishing this result involves steam stripping the diluent from the polymer. In another suitable method, the polymerization mixture is added to an alcohol to cause coagulation of the polymer. The polymer is then separated from the alcohol by filtration or any other suitable method.

The unsaturated copolymer of this invention is converted into a hydrogenated copolymer by hydrogenation to remove from about 10 weight percent to about 100 weight percent of the olefinic unsaturation of the polymer without removing substantial amounts of aromatic unsaturation. The preferred percentage of olefinic unsaturation removed by hydrogenation ranges from about 70 weight percent to about 100 weight percent without removing substantial amounts of aromatic unsaturation.

The hydrogenation step can be carried out prior to coagulation and recovery of the polymer.

The hydrogenation can be accomplished in the presence of a variety of catalysts of either the heterogeneous or homogeneous type. Examples of suitable heterogeneous catalyst systems are nickel on keiselguhr, Raney nickel, copper-chromium oxide, molybdenum sulfide, and finely divided platinum or other noble metals on suitable carriers. Homogeneous catalysts are preferred. Such homogeneous hydrogenation catalysts can be prepared by reducing a cobalt, nickel, or iron carboxylate or alkoxide with an alkylalumium compound. An example of a preferred homogeneous catalyst is that formed through the reduction of nickel octoate (nickel $C_8$ carboxylate) by triethylaluminum. The polymer, preferably in solution in an inert solvent, is contacted with the catalyst under conditions which include temperatures in the range of about 0° to 250° C. and pressurization with hydrogen up to a total pressure of about 7,000 kPa. The reaction time can vary from one minute to as long as 25 hours or more. Preferred conditions involve temperatures of 10° to 200° C., hydrogen pressures of 70 to 3,500 kPa and reaction times of about 10 minutes to 10 hours. When treating the polymer in solution, the pressure is sufficiently high to maintain the reaction mixture substantially in the liquid phase.

Upon the effective completion of the hydrogenation reaction, the hydrogenated polymer can be isolated by conventional techniques. For example, the catalyst components can be converted to water-soluble salts and washed from the polymer solution. An antioxidant can be added if desired followed by coagulation of the polymer and, finally, removal of solvent traces under reduced pressure.

The novel hydrogenated copolymers of this invention possess an unexpectedly high green tensile strength, exhibit elastomeric properties without curing, and show improved environmental resistance or stability as compared to the unhydrogenated copolymers.

Since these novel hydrogenated copolymers require no curing, they are moldable and any scrap generated from such rubber can be directly reclaimed and reused without requiring any degradative or other processing steps prior to reusing the scrap.

These novel hydrogenated copolymers can be used in the fabrication of belts, hoses, and extruded and molded goods for diverse applications, including those in the building construction, automotive, medical and household article fields. Furthermore, these hydrogenated copolymers have utility in the areas of adhesives and protective coatings.

The invention will still be more fully understood from the following examples, which are intended to illustrate, not to limit, the scope of the invention.

EXAMPLE I

Monomers in quantities as shown in Recipe I were polymerized by sequential monomer addition in a 26 ounce capacity glass vessel employing essentially anhydrous reactants and conditions. Two runs were carried out with the same relative quantities of monomers but employing different polyfunctional coupling agents. In each step the polymerization was continued until essentially complete.

The following recipe was used for the preparation of the polymers of this invention.

Recipe I

| Preparation of Parent Polymers | | |
|---|---|---|
| | Run | |
| | 1 | 2 |
| Step I | | |
| Cyclohexane, parts by weight | 390 | 390 |
| Sec-butyllithium, mehm[a] | 2.8 | 2.8 |
| Styrene, parts by weight | 18 | 18 |
| Polymerization time, minutes | 45 | 45 |
| Polymerization temperature, °C. | 70 | 70 |
| Step II | | |
| Isoprene, parts by weight | 30 | 30 |
| Polymerization time, minutes | 45 | 45 |
| Polymerization temperature, °C. | 70 | 70 |
| Step III | | |
| 1,3-Butadiene | 12 | 12 |
| Polymerization time, minutes | 45 | 45 |
| Polymerization temperature, °C. | 70 | 70 |
| Step IV | | |
| Divinylbenzene, mehm[a] | 7.4 | — |
| Silicon tetrachloride, mehm[a][b] | — | 3.3 |
| Reaction time, minutes | 20 | 20 |
| Reaction temperature, °C. | 70 | 70 |

[a]Mehm = milliequivalents per 100 grams of total monomers added in all steps of recipe.
[b]Added incrementally over a period of about 10 minutes, 70 percent of the total amount being added initially, and the remainder in three equal increments.

In each run following Step IV, one part by weight of 2,6-di-t-butyl-4-methylphenol per 100 parts by weight of polymer was added as an antioxidant. This antioxidant was added in a 50/50 volume ratio mixture of toluene and isopropyl alcohol. Thereafter, a sufficient quantity of isopropyl alcohol was added to coagulate the polymer. The coagulated polymer was collected by filtration and dried under reduced pressure.

The physical properties of the polymers prepared in Example I are shown in the following table:

TABLE II

| Physical Properties of Unhydrogenated Parent Polymers[a] | | |
|---|---|---|
| | Run | |
| | 1 | 2 |
| Inherent viscosity | 0.85 | 0.86 |
| Molecular weight, $M_w$ | 542,000 | 159,000 |
| Molecular weight, $M_n$ | 205,000 | 112,000 |
| Block styrene, % by weight | 29.2 | 30.3 |
| Tensile (23° C.), psi[b] | 3,100 | 4,200 |
| Elongation (23° C.), %[b] | 1,800 | 1,700 |

[a]Compositions as prepared in Recipe I.
[b]ASTM D-412-75, modified by use of samples of dimensions 1 in. × 0.125 in. × 0.040 in.

The unhydrogenated polymers of Example I were hydrogenated using a reduced nickel hydrogenation catalyst prepared by treating a 6 percent by weight solution of nickel octoate (nickel $C_8$ carboxylate) in cyclohexane with a solution of triethylaluminum in cyclohexane in quantities sufficient to give an aluminum/nickel molar ratio of 2.5/1. Fifty (50) grams of polymer were dissolved in 600 ml (468 grams) of cyclohexane and subjected to hydrogenation in the presence of the reduced nickel hydrogenation catalyst in a ½ gallon capacity glass reactor. The reactor and its contents were purged thoroughly with nitrogen prior to the addition of sufficient reduced nickel solution to contain 0.50 part by weight nickel per one hundred parts by weight polymer. With continuous stirring, hydrogen was added at 345 kPa pressure. After a slight temperature surge to about 50° C., the temperature was regulated at 30° C. for the remainder of the two hour reaction period. At the end of the hydrogenation period the reaction mixture was treated with water (50–100 ml) to deactivate the catalyst. Oxygen was then added and the mixture stirred at 70° C. until the mixture changed to a light gray or green color. The reaction mixture was washed with a solution of phosphoric acid and ammonium phosphate (¼ weight ratio) and then washed with water. Following the water wash, 2,6-di-t-butyl-4-methylphenol (0.5 part by weight per hundred parts of polymer) was added in a 50/50 (by volume) toluene/isopropyl alcohol solution. The hydrogenated polymer was isolated by coagulation with isopropyl alcohol and dried under reduced pressure at 50° C.

Physical properties of these hydrogenated polymers are shown in the following Table III.

TABLE III

| Tensile Properties of Hydrogenated Polymers | Run | |
|---|---|---|
| | 1 | 2 |
| Tensile (23° C.), psi[a] | 4,900 | 5,600 |
| Elongation (23° C.), %[a] | 1,100 | 1,000 |

[a]ASTM D-412-75, modified by use of samples of dimensions 1 in. × .15 in. × 0.040 in.

From the data of Table II it can be seen that the unhydrogenated polymers obtained in runs 1 and 2 have good tensile strength. Referring to the data in Table III, hydrogenation of the polymers obtained in runs 1 and 2 resulted in an unexpected and significant improvement in the green tensile strength (33 percent and 58 percent increase, respectively).

Reasonable variations and modifications, which will become apparent to those skilled in the art, can be made in this invention without departing from the spirit and scope thereof.

I claim:

1. A composition of matter which comprises a block polymer having the general configuration

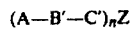

(A—B'—C')$_n$Z wherein A is a block of a polymerized monovinylarene monomer having 8 to 16 carbon atoms per monomer unit, B' is a hydrogenated block of polymerized conjugated diene having 4 to 12 carbon atoms per monomer unit wherein said polymerized block has on the average at least one hydrocarbyl side chain branch for about every 10 carbon atoms of the polymeric backbone, C' is a hydrogenated block of low vinyl polybutadiene wherein said hydrogenated block of low vinyl polybutadiene is produced from a non-hydrogenated low vinyl polybutadiene block with a vinyl content of no more than about 15 mol percent, n is an integer of from 2 to 4, and Z is the residue of a polyfunctional initiator when n=2 to 4, or the residue of a polyfunctional coupling agent when n=2 to 4, or a covalent chemical bond when n=2 and wherein said polymonovinylarene block A is 10 to 60 weight percent of the total polymer, said hydrogenated branched conjugated diene block B' is 10 to 80 weight percent of the total polymer, and said hydrogenated low vinyl polybutadiene block C' is 5 to 60 weight percent of the total polymer and wherein said hydrogenated polymer has a weight average molecular weight ranging from about 5,000 to about 1,000,000 and wherein from about 10 percent to about 100 percent of the unsaturation in each of the blocks B' and C' has been removed by hydrogenation.

2. A hydrogenated block polymer according to claim 1 wherein said polymonovinylarene block A is 20 to 40 weight percent of the total polymer, said hydrogenated branched conjugated diene block B' is 40 to 60 weight percent of the total polymer, and said hydrogenated low vinyl polybutadiene block C' is 10 to 30 weight percent of the total polymer and wherein said polymer has a weight average molecular weight ranging from about 100,000 to about 600,000 and wherein from about 70 percent to about 100 percent of the unsaturation in each of the blocks B' and C' has been reduced by hydrogenation.

3. A composition of matter according to claim 1 wherein A is a polymeric block formed from at least one monomer selected from the group consisting of styrene, alpha-methylstyrene, 3-methylstyrene, 4-n-propylstyrene, 4-methoxystyrene, 1-vinylnaphthalene, 4-cyclohexylstyrene, p-tolylstyrene and wherein B' is a hydrogenated polymeric block formed from at least one monomer selected from the group consisting of isoprene, 2,3-dimethyl-1,3-butadiene, piperylene, 3-butyl-1,3-octadiene, 2-phenyl-1,3-butadiene, 1,3-butadiene.

4. A composition of matter according to claim 3 wherein said Z is the residue of a polyfunctional coupling agent.

5. A composition of matter according to claim 4 wherein said polyfunctional coupling agent is divinylbenzene.

6. A composition of matter according to claim 4 wherein said polyfunctional coupling agent is silicon tetrachloride.

7. A composition of matter according to claim 3 wherein said Z is the residue of a polyfunctional initiator.

8. A composition of matter according to claim 3 wherein said Z is a covalent chemical bond.

9. A composition of matter according to claim 3 wherein said monomer for A is styrene and wherein said monomer for B is isoprene and wherein said Z is the residue derived from divinylbenzene.

10. A composition of matter according to claim 3 wherein said monomer for A is styrene and wherein said monomer for B is isoprene and wherein Z is the residue derived from silicon tetrachloride.

11. A composition of matter according to claim 1 wherein said polystyrene block A is 30 weight percent of the total polymer, said polyisoprene block B is 50 weight percent of the total polymer, said low vinyl polybutadiene block C is 20 weight percent of the total polymer and said Z is the residue derived from divinylbenzene.

12. A composition of matter according to claim 1 wherein said polystyrene block A is 30 weight percent of the total polymer, said polyisoprene block B is 50 weight percent of the total polymer, said low vinyl polybutadiene block C is 20 weight percent of the total polymer and said Z is the residue derived from silicon tetrachloride.

* * * * *